March 14, 1972 M. HATZAKIS 3,649,393

VARIABLE DEPTH ETCHING OF FILM LAYERS USING
VARIABLE EXPOSURES OF PHOTORESISTS
Filed June 12, 1970

INVENTOR
MICHAEL HATZAKIS

BY John J. Goodwin
ATTORNEY

United States Patent Office 3,649,393

Patented Mar. 14, 1972

3,649,393

VARIABLE DEPTH ETCHING OF FILM LAYERS USING VARIABLE EXPOSURES OF PHOTORESISTS

Michael Hatzakis, Ossining, N.Y., assignor to International Business Machines Corporation, Armonk, N.Y.

Filed June 12, 1970, Ser. No. 45,676

Int. Cl. C23f *1/00*

U.S. Cl. 156—3 4 Claims

ABSTRACT OF THE DISCLOSURE

A method of etching film material such as a thin film layer where the thickness of the thin film is not uniform. The thin film layer, which may consist of an oxide, a metal or the like, is normally supported on a substrate. The thin film layer has markedly different thickness in different areas to be etched. The photoresist coated thin film is exposed by an electron beam in a series of separate exposures with different exposure densities. The thickest area is exposed first with the highest exposure density. Subsequent exposures are made in the other desired areas with decreasing densities in accordance with decreasing thickness. In the development steps, the photoresist is developed until the area of highest exposed density is opened and the thin film is etched to the next thickness level. Development is continued until the second highest exposed density is opened and then the thin film is etched to the next thin film level and so on.

BACKGROUND OF THE INVENTION

Field of the invention

The present invention relates to the field of photoetching integrated circuits and more particularly to photoetching of metals, oxides and the like by electron beam techniques.

Prior art

The prior art method of photoetching films of varied thickness consists of a series of separate exposures and etchings. Thus, a separate photoresist layer is exposed for each thickness and is then separately etched. When electron beam exposure is employed, the prior art method is inefficient because each resist layer requires baking and thus employing a sequence of separate resist layers requires an equal number of separate bakings. Also, the film must be removed from the electron beam apparatus after each exposure which is inefficient because the exposure is done in a vacuum chamber. Also, the film requires careful realignment each time it is placed back in the electron beam apparatus.

In the method of the present invention, the photoresist is placed in the electron beam device only once; thereby requiring one baking. Multiple exposures are made without removing the film from the electron beam apparatus.

SUMMARY OF THE INVENTION

An object of the present invention is to provide a mmethod of photoetching a thin film having areas of different thickness.

Another object of the present invention is to provide a method of photoetching a thin film using a series of separate exposures having different exposure densities.

The foregoing and other objects, features and advantages of the invention will be apparent from the following more particular description of a preferred embodiment of the invention, as illustrated in the accompanying drawings.

Figure 1:
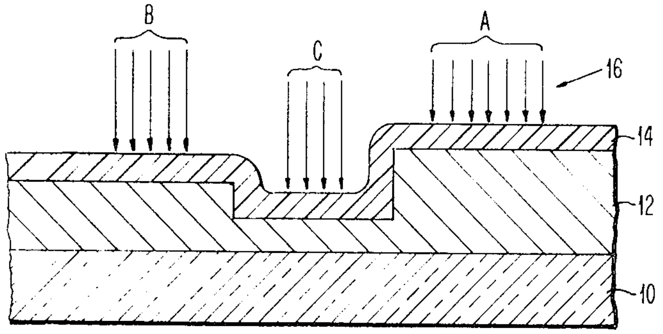
FIG. 1 is a schematic drawing showing a photores'st coated thin film having different thicknesses being exposed by an electron beam.

Referring to FIG. 1, a structure which may be fabricated into a microcircuit or a mask for a microcircuit is shown including a rigid substrate 10 and film material such as a thin film layer 12. The thin film layer 12, which may be a metal or a metal oxide, has areas of different thickness. The thin film layer is coated with a layer of photoresist 14. The photoresist layer, which in this example is a positive resist, is exposed by an electron beam in the areas where the thin film material is to be removed. Typical areas are designated A, B and C in FIG. 1. The three areas A, B and C are exposed by an electron beam in a conventional electron beam device with a beam density proportional to the relative thickness of the thin film beneath the area. In the present example, the thin film thickness beneath area A is three times that beneath area C and the thickness beneath area B is twice that beneath area C.

The photoresist area A is exposed to the electron beam 16 in the electron beam device at a suitable charge density depending on the type of photoresist employed. Photoresist area B is then exposed with a beam charge density which is approximately two-thirds of that used for area A because the thin film thickness under area B is two-thirds of that under area A assuming a linear relationship between beam exposure density and thickness of photoresist removed during development. The photoresist of area C is exposed with the electron beam having a charge density of approximately one-third the original value.

Figure 2:
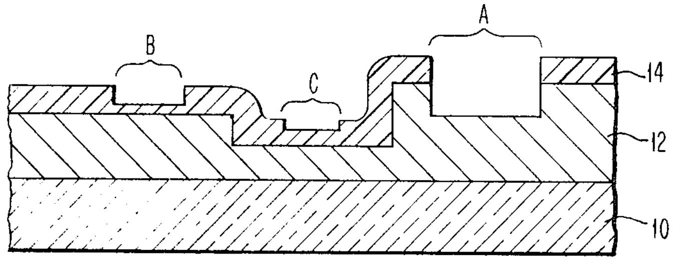
FIG. 2 is a schematic drawing showing the thin film of FIG. 1 after first development and etching.

The thin film structure is then removed from the electron beam device. The photoresist layer 14 is developed in a conventional manner until the thin film surface of area A is reached. The structure is placed in an etching bath and the thin film material of area A is etched until a thickness approximately equal to the second level thickness is reached. This is depicted in FIG. 2. It is to be noted in FIG. 2 that during development, the entire photoresist layer in area A was removed, however, due to the differences in exposure charge density the photoresist layer in areas B and C were only reduced by two-thirds and one-third respectively.

Figure 3:
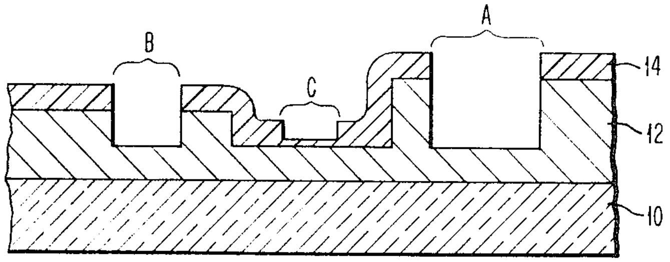
FIG. 3 is a schematic drawing showing the thin film of FIG. 1 after second development and etching.

After the etching step, the development is continued until the remainder of the photoresist in the B area is removed. Photoresist material will still be present in area C. The thin film in the B area is then etched away until the thickness of the third level is reached. This is depicted in FIG. 3. After the second etching, the development is continued until the remainder of the exposed photoresist in the C area is removed.

Figure 4:
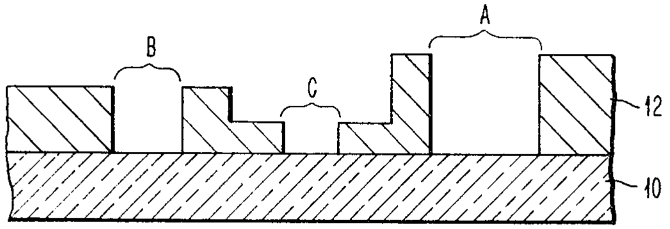
FIG. 4 is a schematic drawing showing the thin film of FIG. 1 after final development and etching.

The thin film material in the three areas A, B and C now have the same thickness, that is, the thickness of the first level. The structure is etched until all the thin film material in the areas A, B and C is removed and the unexposed portions of the photoresist layer is removed by conventional techniques to yield the completed structure as depicted in FIG. 4.

From the foregoing description, it can be seen that an integrated circuit or mask having different areas of thickness can be fabricated wherein the structure is located within the electron beam device only once. In the description, the exposure was made on separate areas of the photoresist using three separate values of electron density. Alternatively, all three areas could have been exposed simultaneously with a given electron density. Then area C could have been masked and a second exposure is made with the same given density; and then areas B and C could have been masked and a third exposure made at the same density. The result is that area B is exposed twice as much as area C and area A is exposed three times as much as area C. Resultant development and etching as described will produce the same results as shown in FIGS. 1 through 4.

In the described method, it is desirable to use a photoresist which can be developed over a wide range of exposure charge densities. One such resist is poly (methyl methacrylate), which has an exposure latitude extending over an order of magnitude of charge density. Photoresists of the Shipley type may also be employed.

In the preceding description, an example was given using three thicknesses of thin film. The present method is not limited to three thicknesses but may be employed with any practical number of thicknesses. Also, the present method is not confined to electron beam type exposure but may be used with optical exposure of positive resist of the Shipley type.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A method of etching a film material structure of variable thicknesses that is coated with a photoresist comprising the steps of (A) exposing the photoresist coating over the film areas to be etched to radiation levels proportional to the thicknesses of the film areas, (B) developing the photoresist coating until the thickest film area is uncovered, (C) etching the structure to remove the film material in the uncovered area to a level substantially equal to the next thickness film thickness, (D) developing the photoresist coating until the next thickest film area is uncovered, (E) repeating steps C and D for each succeeding film thickness until the minimum film thickness is uncovered, (F) etching the structure to remove the remaining film material in the uncovered areas.

2. A method of etching according to claim 1 wherein said radiation is a beam of electrons and wherein said film areas are exposed to electron beam densities proportional to the thicknesses of the film areas.

3. A method according to claim 2 wherein said photoresist is polymethyl methacrylate.

4. A method of etching a thin film material structure including a substrate, a layer of thin film material of variable thickness selected from the group consisting of metal and metal oxides disposed on said substrate, and a layer of positive photoresist disposed on said layer of variable thickness thin film material comprising the steps of:

(A) exposing the photoresist layer over the thin film areas to be etched with an electron beam, the density of said electron beam being varied to be proportional to each of the thicknesses of the thin film areas, (B) developing the exposed photoresist until the thickest film area is uncovered, (C) etching the thin film material in the uncovered area to a level substantially equal to the next thickest thin film thickness, (D) developing the exposed photoresist until the next thickest thin film thickness is uncovered, (E) repeating steps C and D for each succeeding thin film thickness until the minimum thin film thickness is uncovered, (F) etching the structure to remove the remaining thin film material in the uncovered areas.

References Cited

UNITED STATES PATENTS

| | | | |
|---|---|---|---|
| 3,236,707 | 2/1966 | Lins | 156—3 |
| 3,272,670 | 9/1966 | Myers | 156—11 UX |
| 3,535,137 | 10/1970 | Haller et al. | 156—8 X |
| 3,536,547 | 10/1970 | Schmidt | 156—2 X |
| 3,544,790 | 12/1970 | Brown | 156—13 X |
| 3,551,196 | 12/1970 | Herczog et al. | 156—17 X |

WILLIAM A. POWELL, Primary Examiner

U.S. Cl. X.R.

156—8, 12, 13